United States Patent [19]

Shioiri et al.

[11] Patent Number: 4,764,243

[45] Date of Patent: Aug. 16, 1988

[54] TAPE SPLICING APPARATUS

[75] Inventors: Shigeo Shioiri, Chiba; Yuzo Otomine, Kanagawa, both of Japan

[73] Assignee: Somar Corporation, Tokyo, Japan

[21] Appl. No.: 917,647

[22] Filed: Oct. 14, 1986

[30] Foreign Application Priority Data

Oct. 12, 1985 [JP] Japan .................................. 60-227296
Nov. 26, 1985 [JP] Japan ............................ 60-182325[U]

[51] Int. Cl.⁴ ........................ B31F 5/06; G03D 15/04
[52] U.S. Cl. .................................. 156/505; 156/159; 156/304.3; 156/518
[58] Field of Search ............ 156/505, 506, 159, 304.3, 156/502, 518

[56] References Cited

U.S. PATENT DOCUMENTS

| | | | |
|---|---|---|---|
| 2,660,221 | 11/1953 | Simpson | 156/506 |
| 3,075,572 | 1/1963 | Catozzo | 156/505 |
| 3,428,511 | 2/1969 | Catozzo | 156/505 |
| 3,533,885 | 10/1970 | Gustafson | 156/505 |
| 4,589,314 | 5/1986 | Ralph et al. | 83/144 |

FOREIGN PATENT DOCUMENTS 1125919  11/1956  France .................................. 156/505

Primary Examiner—Michael Wityshyn
Attorney, Agent, or Firm—Sughrue, Mion, Zinn, Macpeak & Seas

[57] ABSTRACT

A splicing apparatus for splicing information recording tapes to each other is disclosed which comprises a stationary member having a plate into which an information recording tape guide groove is formed, a movable member movably provided to the stationary member, an information recording tape guide member for guiding the recording tapes when the information recording tapes are fed along the information recording tape guide groove; an adhesive tape cutter for cutting an adhesive tape in a predetermined length, and springs for urging the information recording tape guide member upwardly to a predetermined position. The adhesive tape cutter has a pair of spaced blades parallel to the information recording tape guide groove, and is provided on the movable member. A pair of slits into which the spaced blades of the first cutter may be inserted are formed between the information recording tape guide member and a bottom portion of the information tape guide groove.

9 Claims, 4 Drawing Sheets

TAPE SPLICING APPARATUS

BACKGROUND OF THE INVENTION

The present invention relates to a splicer for compiling information recording tapes, and more particularly to a technique for cutting adhesive tapes used with a splicer for compiling digital audio tapes (DATs) for broadcasting use.

A conventional splicer for compiling information recording tapes is used in such a manner that information recording tapes such as magnetic audio tapes are laid within grooved guide rails, and cut by cutting blades under pressure, and then the two information recording tapes to be spliced to each other are provided with a thin adhesive tape. Thereafter, the end portion of the adhesive tape is cut so that an end portion of the adhesive tape is aligned with that of the information recording tapes.

However, according to the conventional tape splicer, it is difficult to exactly cut the information recording tapes because the tape is extremely thin and tends to have a warpage, a curvature and elongation.

Also, in the typical conventional splicer, in order to prevent the adhesive tape cutting blades from being damaged, holes are formed in a grooved guide rail at positions corresponding to the cutting blades. Therefore, when the end portion of the adhesive tape is cut under pressure, the cutting portions would be bent or curved.

SUMMARY OF THE INVENTION

In order to overcome the above-noted defects, according to the present invention, there is provided a splicing apparatus for splicing information recording tapes to each other, comprising: a stationary member having a plate into which an information recording tape guide groove is formed; a movable member movably provided to the stationary member; information recording tape guide means for guiding the information recording tapes when the information recording tapes are fed along the information recording tape guide groove; a first cutter means for cutting an adhesive tape in a predetermined length; and spring means for urging the information recording tape guide means upwardly to a predetermined position. The first cutter means has a pair of spaced blades parallel to the information recording tape guide groove, and is provided on the movable member. A pair of slits into which the spaced blades of the first cutter may be inserted are formed between the information recording tape guide means and a bottom portion of the information tape guide groove.

Also, according to another aspect of the invention, the movable member is provided with a pressure member for depressing the adhesive tape against the information recording tapes to be spliced. The pressure member may be provided with an elastic member.

BRIEF DESCRIPTION OF THE DRAWINGS

In the accompanying drawings.

DETAILED DESCRIPTION OF THE PREFERRED EMBODIMENTS

Figure 1:
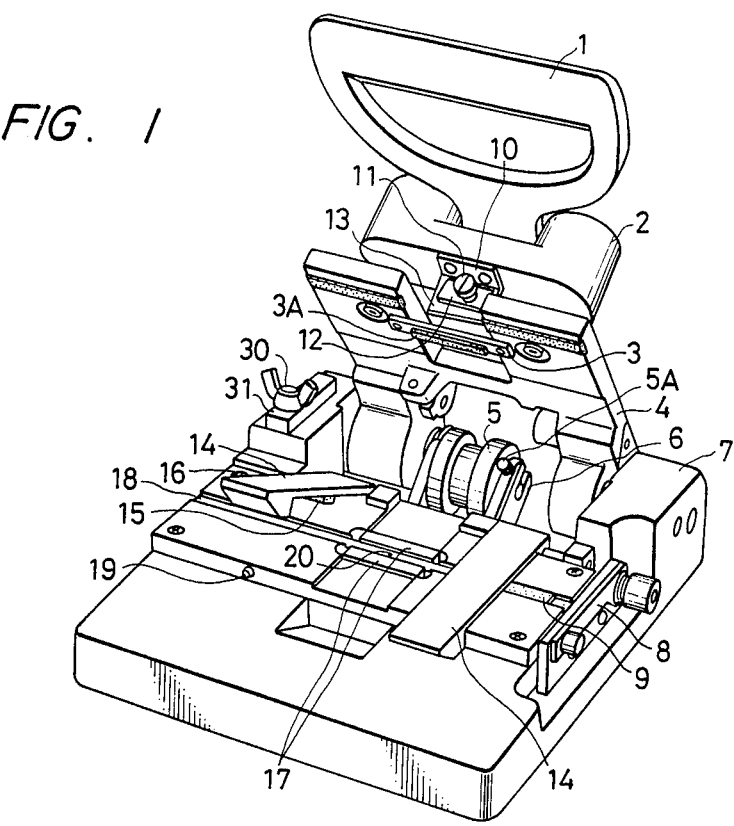
FIG. 1 is a perspective view showing a splicer in accordance with the invention.

The present invention will now be described with reference to the accompanying drawings.

In the embodiments, the same reference numerals are used to designate like members or components that have the same functions, and hence, duplicating explanations therefor will be omitted.

FIG. 1 is a schematic perspective view showing a splicer for compiling DATs to which the present invention is applied.

In FIG. 1, there are shown the splicer having a handle 1, an adhesive tape cutter holder cast 2, and an information recording tape/adhesive tape pressure plate 3. It is preferable that the tape pressure plate 3 be provided with an elastic pressing member made of elastic materials such as felts, rubber or the like. The elastic material has a sufficient elasticity and a property that a static electricity is not liable to be generated. The splicer further includes a base spindle cast 4, an adhesive tape roller 5, an adhesive tape roller holder 6, a base cast 7, an information recording tape cutter 8, an information recording tape cutter support rubber 9 and an adhesive tape holder 10. The adhesive tape holder 10 is mounted on the adhesive tape holder cast 2. A tape cutter set screw 11 is used for setting an adhesive tape cutter blade 13 mounted on an adhesive tape cutter setting plate 12.

Reference character 5A shows an adhesive tape roller attachment/detachment member for setting or resetting the adhesive tape roll 5. The adhesive tape roll attachment/detachment member 5A is biased by spring means normally in a direction to hold the roller 5. In order to set the adhesive tape roll, the adhesive tape roll attachment and/or detachment member 5A is manually lifted upwardly against the spring force of the spring means to set the tape roll 5 in place. Also, in order to reset the tape roll, the adhesive tape roll attachment-/detachment member 5A is manually lifted upwardly against the spring force to remove the adhesive tape roll. In FIG. 1, there are further shown an information recording tape pressure arm 14, an arm rubber 15, a main plate 16, an information tape guide member 17, an information recording tape guide groove 18, a pressure arm stop 19 and a center mark 20.

Figure 2:
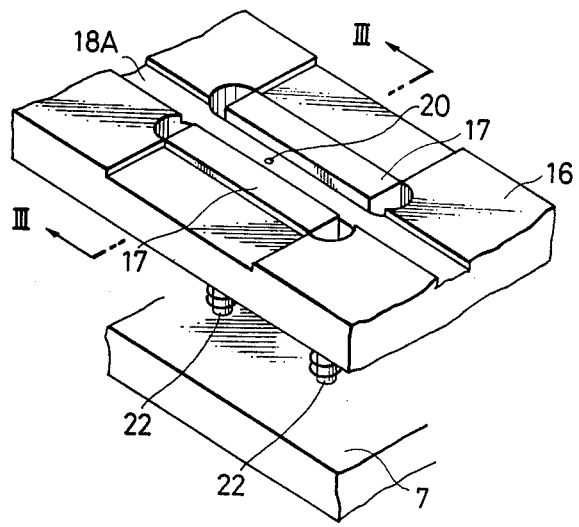
FIG. 2 is a partial perspective view showing a primary part of the splicer shown in FIG. 1.
Figure 3:
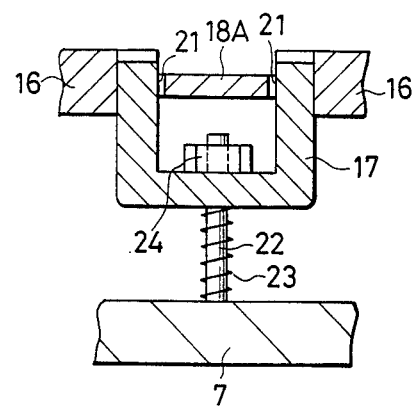
FIG. 3 is a cross-sectional view taken along the line III—III of FIG. 2.
Figure 4:
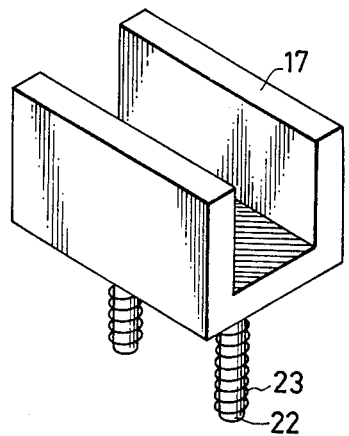
FIG. 4 is a perspective view of an information tape guide member shown in FIG. 1.
Figure 6:
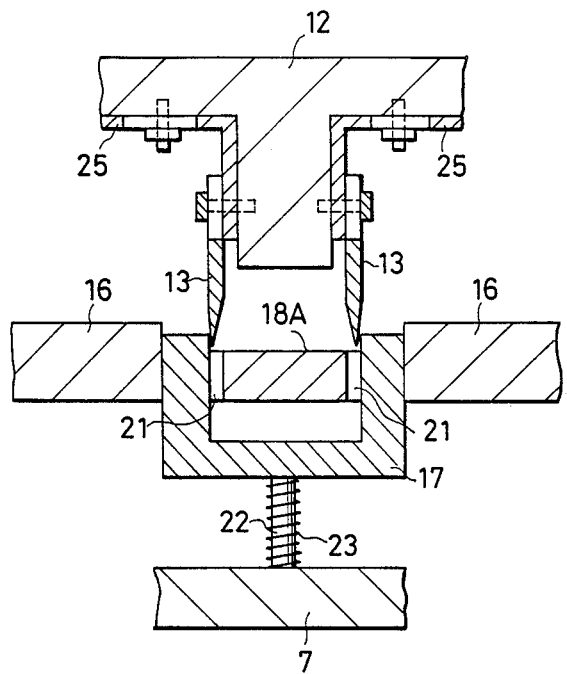
FIG. 6 is a cross-sectional view showing the adhesive tape cutter structure shown in FIG. 1.
Figure 7:
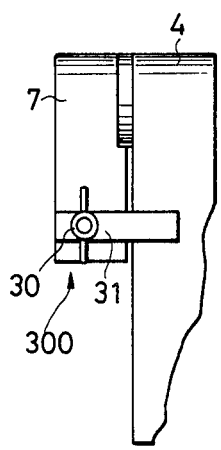
FIG. 7 is a partial plan view showing a stop mechanism.

The information tape guide member 17 is disposed at positions corresponding to the tape cutter blades 13 as best shown in FIG. 6. A width of a bottom 18A of an information recording tape splicing portion of the information recording tape guide groove 18 is somewhat smaller than that of the other portion of the guide groove 18 as shown in FIGS. 2 and 3. The width of the splicing portion of the guide groove 18 is at, for example, 5 mm and the width of the other portion of the guide groove 18 is at, for example 6.3 mm. Slits (each having a width of 0.7 mm) into which end portions of the adhesive tape cutter blades 13 may be inserted are formed between side portions of the information tape guide member 17 and the side portions of the bottom 18A of the splicing portion. As shown in FIG. 6, the information recording tape guide member 17 is pressed toward the adhesive tape cutter blades 13 by elastic means 22 such as coil springs, leaf springs, a rubber member or the like. Further, as shown in FIGS. 3 and 4, the elastic means is adjusted by bolts 23 and nuts 24 so that upper ends of the information recording tape guide member 17 are somewhat lower than the top surfaces of the groove 18 but higher than the bottom surfaces of the groove 18.

Figure 5:
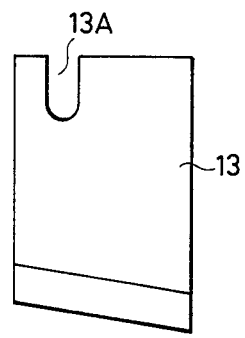
FIG. 5 is a side elevational view of a blade of an adhesive tape cutter shown in FIG. 1.

Each edge of the adhesive tape cutter blades 13 is slanted at an angle of about 10° with respect to a horizontal plane as shown in FIG. 5. Also, the edge is wedge-shaped in cross-section as best shown in FIG. 6. As best shown in FIG. 6, the pair of blades 13 are arranged in a staggered manner. An elongated slot 13A is formed in an upper edge portion of each adhesive tape cutter blade 13 so that a space between the adhesive tape cutter blades may be suitably adjusted by the spacer 25. The blades 13 are mounted on the adhesive tape cutter setting plate 12 through spacer 25. The space between the adhesive tape cutter blades 13 is set at a predetermined width, i.e., 6.3 mm by the spacers 25 having screw insertion holes.

Each of the cutter blades is made of materials such as a stainless steel, a hard carbide alloy, a ceramic or the like. It is preferable to use ceramic blades in order to prevent a static electric charge in the blades. The components forming the guide groove 18 are also made of stainless steel, a hard carbide alloy or a ceramic.

According to the present invention, it is preferable that a stop mechanism is provided between the base spindle cast 4 and the base cast 7 for fixing these components together for carrying the splicer. The stop mechanism includes a movable stop rod 31 fixed by a butterfly screw 30 for fixing the base spindle cast 4 and the base cast 7 together.

The operation of the tape splicer in accordance with the foregoing embodiment will now be described.

The information recording tape is set along the information tape guide groove 18, and the set information recording tape is cut at a predetermined position by the information tape cutter 8. End portions of two information recording tapes to be spliced are located in the vicinity of the center mark 20 within the information recording tape guide groove 18. Then, the information recording tape pressure arm 14 is set on the tape.

Subsequently, the information recording tape pressure arm 14 is slid so as to adjust the splicing position. The adhesive tape is paid out from the adhesive tape roller 5 and is adhered to the surfaces of the portion, to be spliced, of the information recording tape at the information tape guide member 17. The adhesive tape is pressed by the operator's fingers to ensure the adhesion. Then, the handle 1 is angularly lowered to cut the adhesive tape so that both ends of the adhesive tape are in alignment with the width of the information recording tape. Subsequently, the spliced portion of the tapes is, if necessary, pressed by the operator's fingers and the tapes are picked up from the information tape guide groove 18 to complete the splicing operation.

When the handle 1 is angularly lowered to cut the information recording tapes so that both ends of the adhesive tape are in alignment with the width of the information recording tapes, the edges of the adhesive tape cutter blades 13 are inserted into slits 21, and the information recording tape guide member 17 is lowered against the spring force of the spring 22 by the adhesive tape cutter blades 13. At this time, the adhesive tape is cut under pressure by the adhesive tape cutter blades 13 under the condition that the adhesive tape be supported between the information tape guide member 17 and the bottom 18A of the information tape guide groove 18. Therefore, the adhesive tape may be cut with high accuracy without damaging edges of the adhesive tape cutter blades 13.

In the case where the tape pressure member 3 has the elastic member 3A, the upper surface of the adhesive tape may be pressed more uniformly than the case of the pressure member having no elastic member.

It is apparent that the present invention is not limited to the foregoing embodiment but various modifications are possible without departing from the spirit and scope of the appended claims.

As described above, according to the present invention, a width of the bottom of the recording tape splicing portion of the recording tape guide groove is smaller than that of the other part of the recording tape guide groove whereby slits into which the blades of the adhesive tape cutter may be inserted are formed between side walls of the guide member and the side faces of the bottom of the guide groove. The guide member is biased toward the adhesive tape cutter side. Thus, when the handle is angularly lowered, the edges of the adhesive tape cutter are inserted into the above-described slits, and the recording tape guide is depressed against the spring means by the adhesive tape cutter. Under the condition that the adhesive tape is supported between the tape guide member and the recording tape guide groove, the adhesive tape is cut under pressure by the adhesive tape cutter blades. Therefore, the adhesive tape may be prevented from being damaged, and the tape may be cut with high accuracy.

Also, in the case where the elastic member is attached to a depressing portion of the pressure plate, the pressure plate will not need a high machining work.

We claim:

1. A splicing apparatus for splicing information recording tapes to each other, comprising:
a stationary member having a plate into which an information recording tape guide groove is formed, said groove having a bottom surface;
a movable member movably provided with respect to said stationary member;
information recording tape guide means disposed at a splicing section of said stationary member for guiding the information recording tapes when the information recording tapes are fed along said information recording tape guide groove in a first direction;
a first cutter means provided on said movable member above said guide means for cutting an adhesive tape in a predetermined length, said first cutter means having a pair of spaced blades parallel to said information recording tape guide groove, each of said cutting blades having first and second sides and having a cutting edge which is tapered on both of said first and second sides, the cutting edge of one of said cutting blades being inclined upwardly along said first direction while the cutting edge of the other of said cutting blades is inclined downwardly along said first direction;
spring means for urging said information tape guide means upwardly to a predetermined position; and
the bottom surface of said groove being narrower in at least a portion of said splicing section than out-side of said splicing section to thereby form a pair of slits between said information recording tape guide means and said bottom portion of said information recording tape guide groove, said slits being wide enough to permit insertion therein of said cutting blades to a depth where said tapered cutting edges are entirely below said bottom surface.

2. The apparatus of claim 1, further comprising a second cutter means for cutting said information recording tapes to be spliced, said second cutter means being provided on said stationary member.

3. The apparatus of claim 1, further comprising an adhesive tape feeding means for feeding said adhesive tape from an adhesive tape roll provided on said stationary member.

4. The apparatus of claim 1, wherein said information recording tape guide means includes a substantially U-shaped cross-section, said tape guide means having top end surfaces and a lower connecting portion which is coupled to said spring means.

5. The apparatus of claim 4, wherein the top end surfaces of the tape guide means is held at a higher level than that of the bottom of said tape guide groove, when said blades of said first cutter means is kept out of said slits.

6. The apparatus of claim 1, wherein said movable member includes a pressure member for depressing the adhesive tape against said information recording tapes to be spliced.

7. The apparatus of claim 6, wherein said pressure member includes an elastic member.

8. The apparatus of claim 1, wherein each of said pair of spaced blades of said first cutter means is wedge-shaped in cross-section.

9. The apparatus of claim 1 further comprising a stop mechanism for fixing said stationary member and said movable member together.

* * * * *